US009328866B2

(12) United States Patent
Kuo

(10) Patent No.: US 9,328,866 B2
(45) Date of Patent: May 3, 2016

(54) TREADMILL LUBRICATING MECHANISM

(71) Applicant: Sports Art Industrial Co., Ltd., Tainan (TW)

(72) Inventor: Hai Pin Kuo, Tainan (TW)

(73) Assignee: Sports Art Industrial Co., Ltd., Tainan (TW)

( * ) Notice: Subject to any disclaimer, the term of this patent is extended or adjusted under 35 U.S.C. 154(b) by 9 days.

(21) Appl. No.: 14/150,844

(22) Filed: Jan. 9, 2014

(65) Prior Publication Data

US 2015/0192247 A1  Jul. 9, 2015

(51) Int. Cl.
*A63B 22/02* (2006.01)
*F16N 13/22* (2006.01)

(52) U.S. Cl.
CPC ............ *F16N 13/22* (2013.01); *A63B 22/0235* (2013.01)

(58) Field of Classification Search
CPC .... A63B 22/00; A63B 22/02; A63B 22/0235; A63B 22/0242; A63B 22/057; F01M 1/02; F16H 57/0489; F16N 7/36; F16N 7/38; F16N 11/00; F16N 11/08; F16N 13/10; F16N 2210/24; F04B 9/02; F04B 9/025; F04B 9/04; F04B 9/047; F04B 13/00; F04B 23/02; F04B 23/025; F04B 23/028; F04B 17/03

USPC ................ 482/51, 54; 184/6.28, 12, 15.1, 26, 184/27.1; 198/500, 501; 417/360, 415; 222/63, 261, 333, 504, 621

See application file for complete search history.

(56) References Cited

U.S. PATENT DOCUMENTS

| | | | |
|---|---|---|---|
| 3,019,773 A * | 2/1962 | Meeker ........................... 91/312 |
| 3,523,629 A * | 8/1970 | Chi ................................ 222/241 |
| 5,433,679 A * | 7/1995 | Szymczak et al. .............. 482/54 |
| 5,913,384 A | 6/1999 | Williams |
| 7,140,485 B1 * | 11/2006 | Chang ........................... 198/500 |
| 7,335,135 B2 | 2/2008 | Wang |
| 7,775,324 B2 * | 8/2010 | Corden et al. ................... 184/16 |
| 2003/0199366 A1 * | 10/2003 | Anderson et al. ............... 482/54 |
| 2008/0312048 A1 * | 12/2008 | Cassano .......................... 482/54 |
| 2010/0038176 A1 * | 2/2010 | Moen et al. .................... 184/7.4 |
| 2011/0005866 A1 * | 1/2011 | Paluncic et al. ................ 184/26 |

* cited by examiner

*Primary Examiner* — Oren Ginsberg
*Assistant Examiner* — Gregory Winter
(74) *Attorney, Agent, or Firm* — Charles E. Baxley

(57) ABSTRACT

A treadmill includes a tread deck supported on a tread base for rotatably supporting an endless belt, a motor driving device coupled to the endless belt for driving the endless belt to move around the tread deck, a lubricant supplying device having a container for containing a lubricant, a pump device attached to the container for pumping the lubricant out of the container, a motor coupled to an actuating rod for actuating the actuating rod toward and away from the pump device and to force the lubricant to flow out through the pump device, and a pipe is coupled to the pump device for receiving the lubricant from the container and for supplying the lubricant to lubricate the endless belt.

5 Claims, 5 Drawing Sheets

TREADMILL LUBRICATING MECHANISM

BACKGROUND OF THE INVENTION

1. Field of the Invention

The present invention relates to a treadmill, and more particularly to a treadmill having an improved lubricating mechanism for suitably or effectively and timely applying or sending or filling or supplying the lubricant or lubricating oil or fluid to various portions or positions or locations, particularly the endless belt of the treadmill and for suitably lubricating the endless belt and for allowing the user to smoothly conduct jogging or running exercises.

2. Description of the Prior Art

Typical treadmills comprise a treadmill deck supported in a base frame or treadmill base, two rollers or wheels disposed or supported in front of and behind the treadmill deck respectively, and an endless belt engaged around the rollers or wheels and also around the treadmill deck for supporting a user and for allowing the user to conduct jogging or running exercises.

For example, U.S. Pat. No. 5,913,384 to Williams discloses one of the typical treadmills also comprising an endless belt engaged around the rollers or wheels and around the treadmill deck for supporting a user and for allowing the user to conduct jogging or running exercises, and a lubricating mechanism for lubricating the treadmill. However, the lubricating mechanism is required to be actuated or operated by the users themselves manually, and may not be actuated or operated automatically to lubricate the treadmill, without being actuated or operated by the users.

U.S. Pat. No. 7,335,135 to Wang discloses another typical treadmill comprising an endless belt engaged around the rollers or wheels and around the treadmill deck for supporting a user and for allowing the user to conduct jogging or running exercises, and a lubricating mechanism including a retaining groove containing a lubricant, and a wool felt having a good absorbability and attached to the bottom surface of the treadmill belt and coupled to the retaining groove for receiving and absorbing the lubricant and for lubricating the treadmill belt.

However, the lubricant absorbed and contained in the wool felt may be consumed and used up after use, and the lubricant should be added and refilled or supplied to the retaining groove of the lubricating mechanism and the wool felt manually by the users themselves, and may not be actuated or operated automatically to lubricate the treadmill.

The present invention has arisen to mitigate and/or obviate the afore-described disadvantages of the conventional lubricating mechanisms for treadmills.

SUMMARY OF THE INVENTION

The primary objective of the present invention is to provide a treadmill including an improved lubricating mechanism for suitably or effectively and timely applying or sending or filling or supplying the lubricant or lubricating oil or fluid to various portions or positions or locations, particularly the endless belt of the treadmill and for suitably lubricating the endless belt and for allowing the user to smoothly conduct jogging or running exercises.

In accordance with one aspect of the invention, there is provided a treadmill comprising a tread base including a front roller and a rear roller rotatably supported on the tread base, a tread deck supported on the tread base, an endless belt engaged around the front and the rear rollers and the tread deck for supporting a user to conduct a jogging exercise, a motor driving device supported on the tread base and coupled to the front roller for rotating and driving the endless belt to move around the tread deck, a lubricant supplying device including a container supported on the tread base for containing a lubricant, a pump device attached to the container for selectively pumping the lubricant out of the container, a first motor including an actuating pin coupled to an actuating rod for actuating and moving the actuating rod toward and away from the pump device and to pump and force the lubricant to selectively flow out through the pump device, and a pipe coupled to the pump device for receiving the lubricant from the container and for supplying the lubricant to various portions or positions or locations, particularly the endless belt of the treadmill and for suitably lubricating the endless belt and for allowing the user to smoothly conduct jogging or running exercises.

The container of the lubricant supplying device includes a mouth opening formed and provided on the container, the pump device includes an insertion tube extended into the mouth of the container, and includes a depressible knob formed and provided on the insertion tube and having an outlet coupled to the pipe for supplying the lubricant out of the container.

The pump device includes a cover formed and provided on the insertion tube and engaged with the mouth of the container for detachably securing the pump device to the container. The lubricant supplying device includes a housing attached to the tread base for supporting the first motor.

The housing includes a casing for supporting the first motor, and the casing includes a compartment formed therein for slidably receiving and engaging with the actuating rod and for guiding the actuating rod to move toward and away from the pump device. The housing includes a base frame attached to the tread base, and a bracket attached to the base frame, and the casing is attached to the bracket.

The tread base includes a pulley attached to the front roller and rotated in concert with the front roller, the motor driving device includes a second motor having a spindle extended outwardly therefrom, and a wheel attached to the spindle and rotated in concert with the spindle and coupled to the pulley of the front roller. The wheel includes a hub provided thereon and coupled to the pulley of the front roller for allowing the endless belt to be driven by the motor driving device.

A sensor or detecting element may further be provided and disposed beside the wheel of the motor driving device for sensing a rotational movement of the wheel of the motor driving device, and a processor or processing device or control circuit further provided and electrically connected to the sensor and the first motor for receiving a detecting signal from the sensor and for actuating the first motor to move the actuating rod toward and away from the pump device.

The tread base includes a post provided and disposed on the tread base, and the sensor is attached to and supported on the post. The lubricant supplying device includes a housing attached to the tread base for supporting the first motor, and the control circuit is supported on the housing and electrically connected to the sensor and the first motor.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
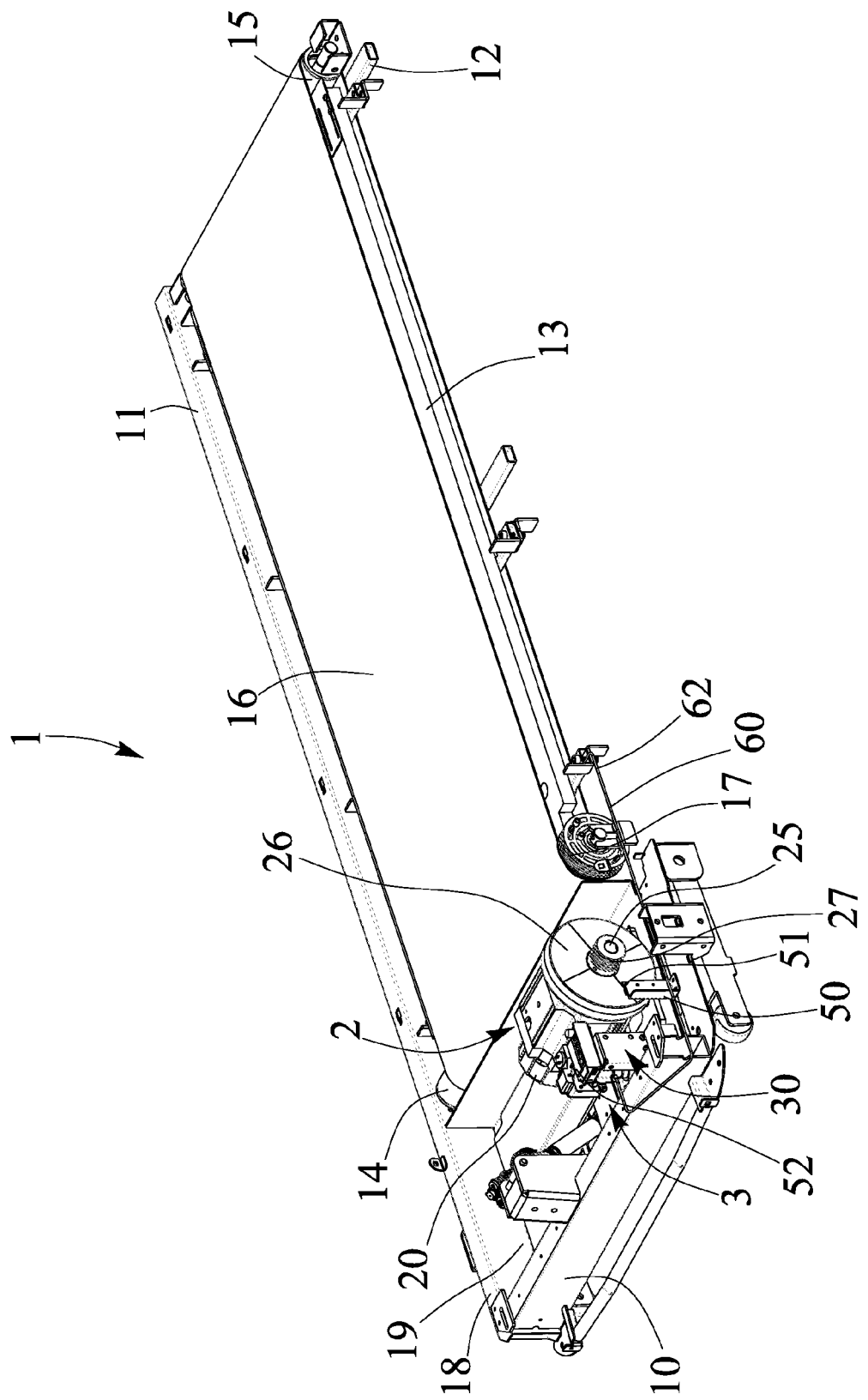
FIG. 1 is a partial perspective view of a treadmill in accordance with the present invention.
Figure 2:
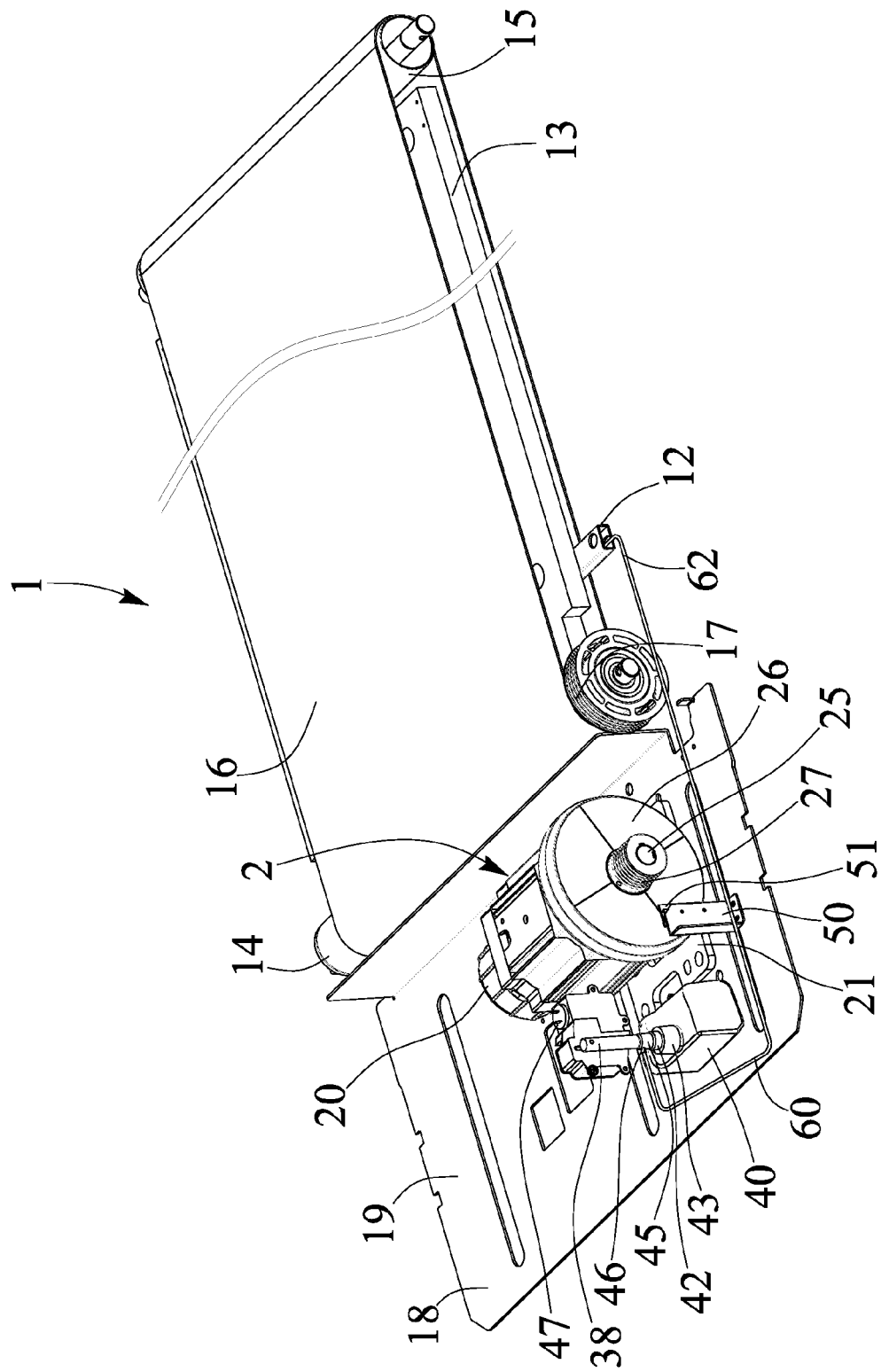
FIG. 2 is an enlarged partial perspective view of the treadmill.

Referring to the drawings, and initially to FIGS. 1 and 2, a treadmill 1 in accordance with the present invention comprises a tread base 10 including two side beams 11, and one or more bars 12 laterally disposed or attached or mounted or secured or straddled between the beams 11 for supporting a tread deck 13 on the tread base 10, a front or first tubular member or wheel or roller 14 and a rear or second tubular member or wheel or roller 15 pivotally or rotatably disposed or supported on the tread base 10 and disposed or supported or located in front of and behind the tread deck 13 respectively, and an endless belt 16 engaged around the rollers 14, 15 and the tread deck 13 for supporting a user and for allowing the user to conduct jogging or running exercises with the rotatable endless belt 16.

The tread base 10 further includes another tubular member or wheel or pulley 17 attached or mounted or secured to the front or first roller 14 and rotated in concert with the front or first roller 14, and includes a container or housing or receptacle 18 formed or provided thereon and disposed or supported or located in front of endless belt 16 and having a compartment or chamber 19 formed therein for receiving or supporting a transmission device 2 and a lubricant applying or sending or filling or supplying device 3. As shown in FIGS. 1-4, the transmission device 2 includes a motor driving device 20 disposed or supported on a bottom or supporting plate 21 which is attached or mounted or secured to the receptacle 18 or the tread base 10 with catches or latches or fasteners 22 (FIG. 4) for coupling to the endless belt 16 and for rotating or driving the endless belt 16.

The motor driving device 20 includes a spindle 25 extended outwardly therefrom, and another roller or pulley or wheel 26 is attached or mounted or secured to the spindle 25 and rotated in concert with the spindle 25, and the wheel 26 includes a further roller or pulley or tubular member or hub 27 formed or provided thereon and extended outwardly therefrom and connected or coupled to the pulley 17 of the front or first roller 14 with a transmission or coupling belt or strap or member (not illustrated) for allowing the endless belt 16 to be rotated or driven around the rollers 14, 15 and the tread deck 13 and for allowing the user to conduct jogging or running exercises. The treadmill 1 may further include a typical column extended upwardly from the front portion thereof (not illustrated) for supporting a typical control panel or control device (not illustrated) thereon and for controlling the treadmill.

The treadmill 1 may further include a typical foldable structure or configuration (not illustrated) for allowing the treadmill to be folded to a compact folding or storing configuration. The above-identified configuration of the treadmill is typical and will not be described in further details. The treadmill 1 in accordance with the present invention is to provide a lubricating mechanism or a lubricant applying or sending or filling or supplying device 3 for suitably or effectively and timely applying or sending or filling or supplying the lubricant or lubricating oil or fluid to various portions or positions or locations, particularly the endless belt 16 of the treadmill 1 and for suitably lubricating the endless belt 16 and for allowing the user to smoothly operate or conduct jogging or running exercises.

For example, as shown in FIGS. 1-3, and 5-6, the lubricant supplying device 3 includes a supporting bracket or frame or casing or housing 30 attached or mounted or secured to the receptacle 18 or the tread base 10, for example, the housing 30 includes a lower or base frame 31 attached or mounted or secured to the receptacle 18 or the tread base 10 with catches or latches or fasteners 32 (FIG. 6) for receiving or engaging or supporting a housing or reservoir or receptacle or container 40 which may be provided for receiving or containing the lubricant, and a bracket 33 attached or mounted or secured to the base frame 31 with catches or latches or fasteners 34, and a casing 35 attached or mounted or secured to the bracket 33 with catches or latches or fasteners 36, the housing 30 may also be formed integral with the receptacle 18 and/or the tread base 10 as one integral piece.

Figure 6:
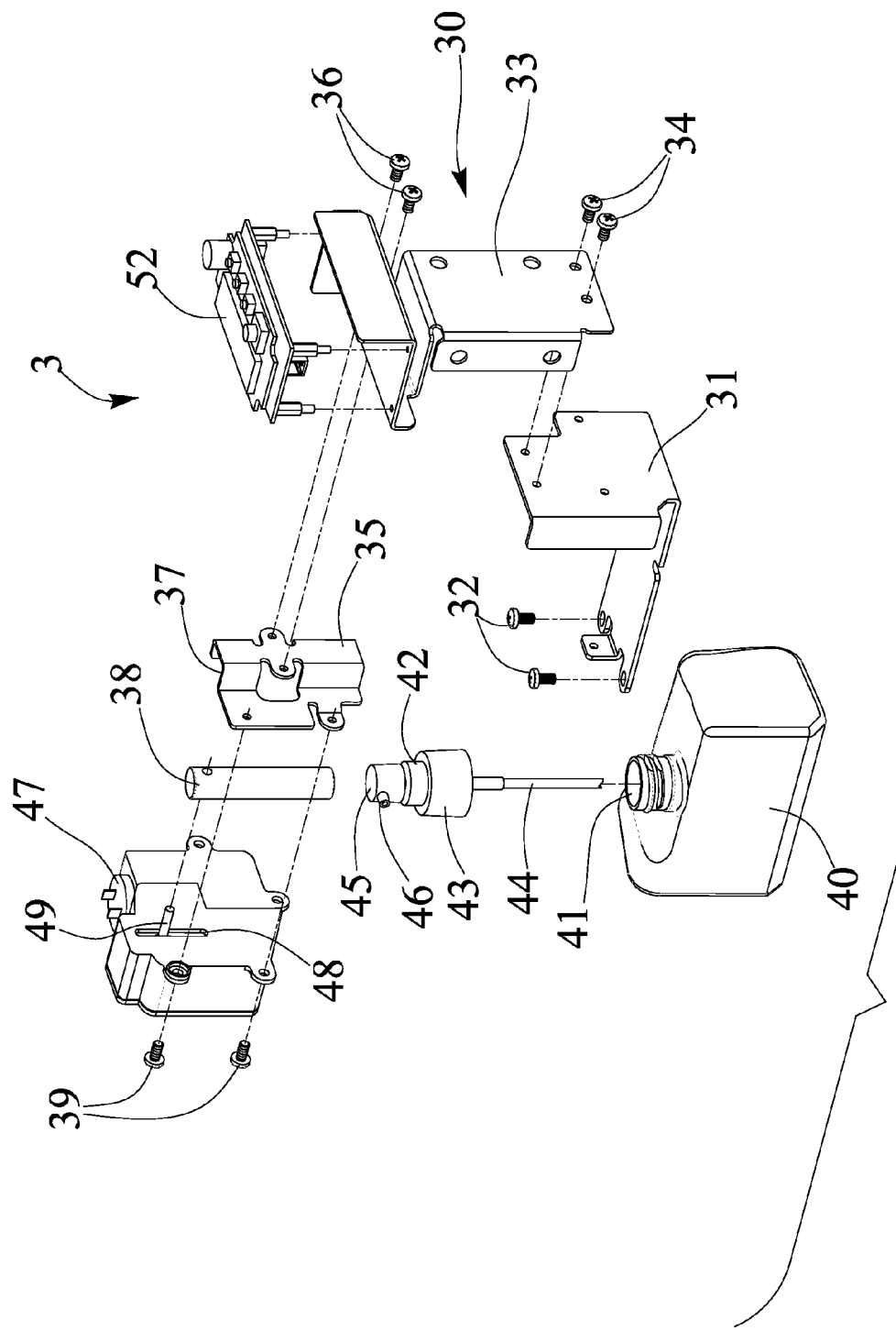
FIG. 6 is a partial exploded view of the lubricant applying or sending or filling or supplying device of the treadmill.

As shown in FIG. 6, the casing 35 of the housing 30 includes a chamber or compartment 37 formed therein for slidably receiving or engaging with an actuating rod 38 (FIG. 6). The container 40 includes an opening or mouth 41 formed or provided on the upper portion thereof for filling the lubricant into and out of the container 40, a pump device 42 includes a cap or cover 43 for attaching or mounting or securing or engaging with the mouth 41 of the container 40 and for detachably or removably securing the pump device 42 to the container 40, and includes an insertion tube 44 extended from the cover 43 and extended into the container 40, and includes a slidable or depressible knob 45 slidably attached or mounted or secured to the cover 43 and depressible or removable relative to the cover 43 and having an exit or outlet 46 formed or provided thereon.

In operation, the knob 45 may be selectively depressed downwardly toward the container 40 for squeezing or pumping or forcing the lubricant to selectively flow out through the outlet 46 of the knob 45. For example, the actuating rod 38 is contacted or engaged with the knob 45 for selectively squeezing or pumping or forcing or depressing the knob 45 downwardly toward the container 40. The lubricant supplying device 3 further includes another motor 47, such as a step motor 47 or the like, attached or mounted or secured to the casing 35 or the housing 30 or the receptacle 18 and/or the tread base 10 with catches or latches or fasteners 39, and the motor 47 includes an actuating pin 49 slidably received or engaged in a longitudinal groove or slot or channel 48 of the motor 47 and engaged with or attached or mounted or secured or coupled to the actuating rod 38 for actuating or moving the actuating rod 38 relative to the container 40.

In operation, the motor 47 may actuate or operate the actuating pin 49 to move the actuating rod 38 upwardly and downwardly toward or away from the knob 45 in order to selectively depress the knob 45 downwardly toward the container 40 and so as to squeeze or pump or force the lubricant to selectively flow out through the outlet 46 of the knob 45. The power driving or moving device or the motor 47 may be selected from a pneumatic or hydraulic actuator, a motor-driven bolt-and-nut device, a solenoid actuated device, or the like, for moving the actuating rod 38 upwardly and downwardly toward or away from the knob 45 in order to selectively depress the knob 45 and to squeeze or pump or force the lubricant to selectively flow out through the outlet 46 of the knob 45 and to lubricate the endless belt 16 or the like.

A connecting or coupling tube or conduit or hose or pipe 60 includes one or first end 61 (FIG. 3) engaged with and coupled to the outlet 46 of the knob 45 for selectively receiving the lubricant from the container 40, and another or second end 62 extended or directed toward various portions or positions or locations of the treadmill 1, particularly the bars 12 and/or the endless belt 16 of the treadmill 1 and for suitably lubricating the endless belt 16 and for allowing the user to smoothly conduct jogging or running exercises. For example, the other or second end 62 of the pipe 60 may be selectively engaged into either one of the bars 12, or onto the tread deck 13 for suitably or effectively applying or sending or filling or supplying the lubricant to the bars 12 and/or the tread deck 13 and/or the endless belt 16 and for allowing the lubricant to be uniformly applied or sent or filled or supplied to the endless belt 16 with a capillary effect or action.

Figure 3:
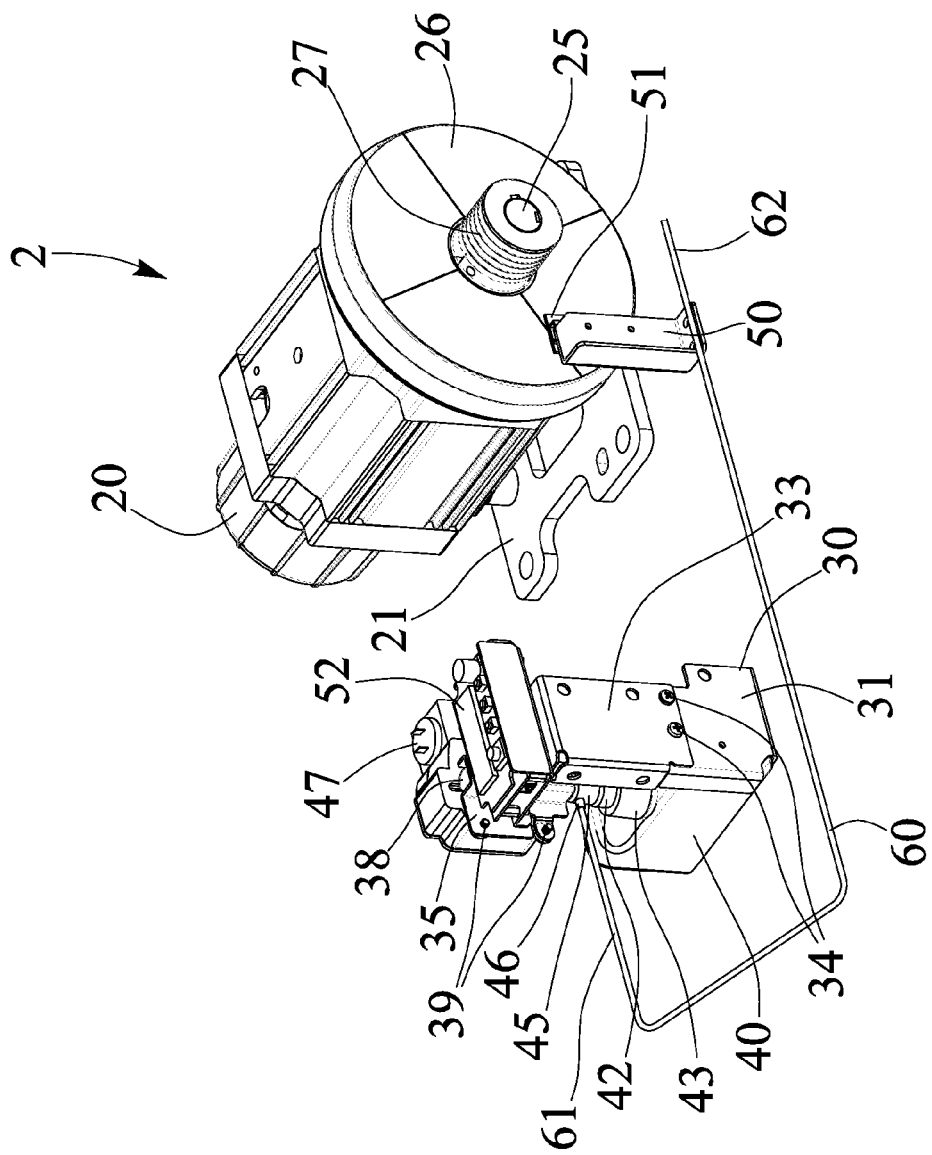
FIG. 3 is a further enlarged partial perspective view of the treadmill.
Figure 5:
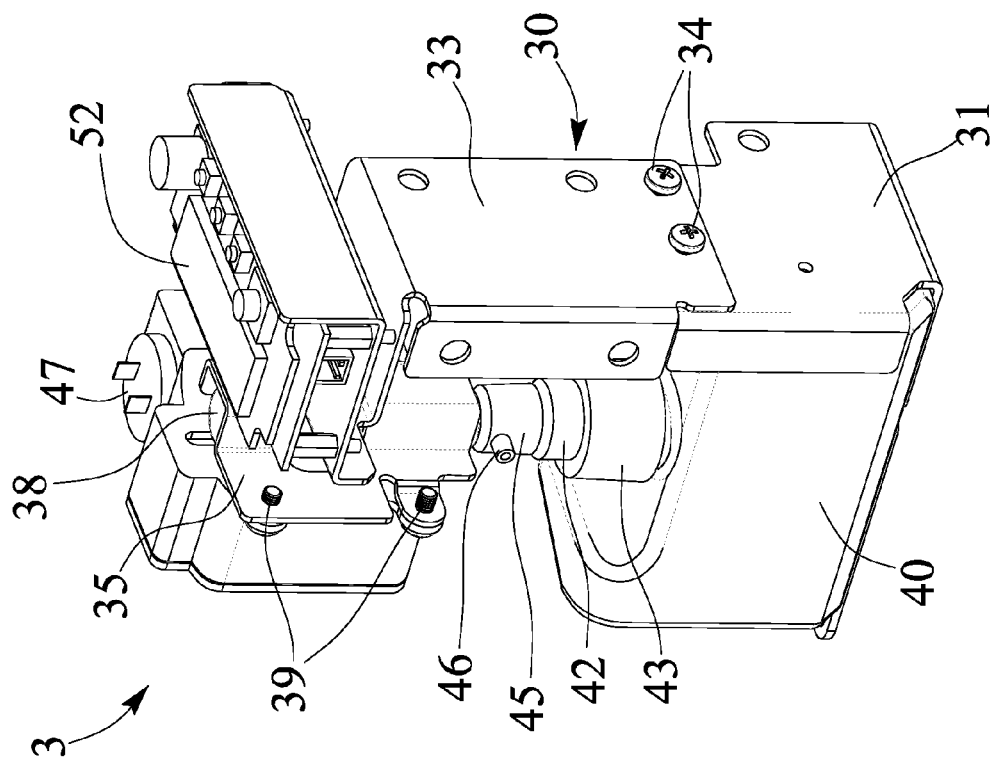
FIG. 5 is a perspective view illustrating a lubricant applying or sending or filling or supplying device of the treadmill.
Figure 4:
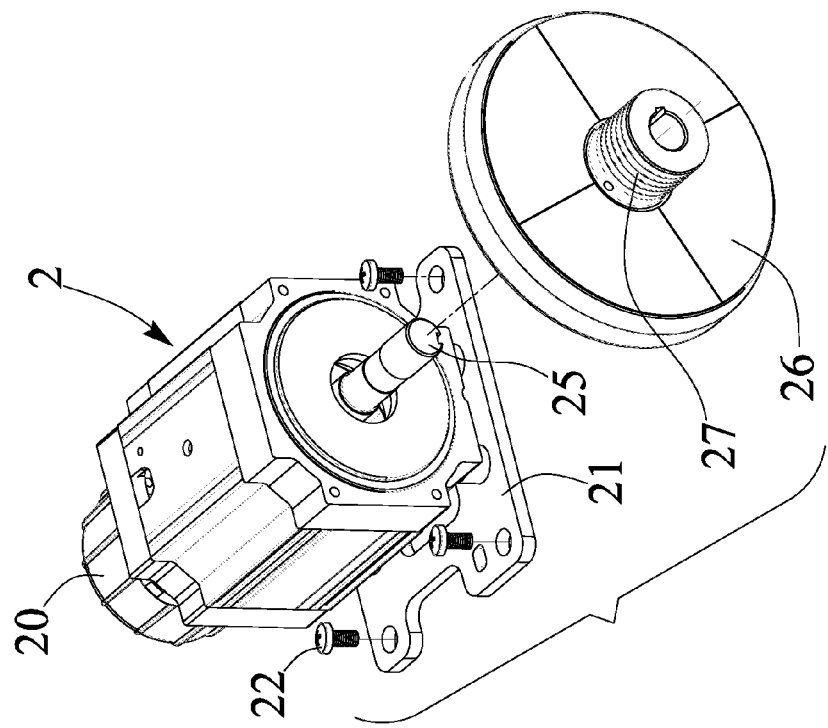
FIG. 4 is an enlarged partial exploded view illustrating a motor driving or transmission device of the treadmill.

As shown in FIGS. 1-3, a column or post 50 may further be provided and disposed or attached or mounted or secured on the receptacle 18 and/or the tread base 10, and a detector or sensor 51 is attached or mounted or secured on the post 50 and disposed or supported or located or arranged beside the transmission belt or member (not illustrated) and/or the wheel 26 for sensing or detecting the rotational movement of the wheel 26 and/or the endless belt 16. A processor or processing device or a control circuit 52 may further be provided and disposed or attached or mounted or secured or supported on the bracket 33 of the housing 30 and electrically connected or coupled to the sensor 51 and/or the motor 47 and/or the motor driving device 20 for receiving the detecting signals from the sensor 51 and for actuating or operating the motor 47 to selectively depress the knob 45.

In operation, the sensor 51 may sense or detect the rotational movement of the wheel 26 and/or the endless belt 16 to determine how long the wheel 26 and/or the endless belt 16 have been worked or actuated or operated, and to determine whether it is required to apply or send or fill or supply the lubricant to lubricate the endless belt 16 or not, the processor or processing device or a control circuit 52 may receive the detecting signals from the sensor 51 and may calculate and determine whether it is required to apply or send or fill or supply the lubricant to lubricate the endless belt 16 or not, and/or may actuate or operate the motor 47 to selectively depress the knob 45 and to selectively supply the lubricant out through the outlet 46 of the knob 45 and the pipe 60, in a predetermined time interval, for example, without stopping the treadmill 1 and without stopping the jogging or running exercises.

Accordingly, the treadmill in accordance with the present invention includes an improved lubricating mechanism for suitably or effectively and timely applying or sending or filling or supplying the lubricant or lubricating oil or fluid to various portions or positions or locations, particularly the endless belt of the treadmill and for suitably lubricating the endless belt and for allowing the user to smoothly conduct jogging or running exercises.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:
1. A treadmill comprising:
a tread base including a front roller and a rear roller rotatably supported on said tread base,
a pulley attached to said front roller and rotated in concert with said front roller,
a tread deck supported on said tread base,
an endless belt engaged around said front and said rear rollers and said tread deck for supporting a user to conduct a jogging exercise,
a motor driving device supported on said tread base and coupled to said front roller for rotating and driving said endless belt to move around said tread deck,
a housing attached to said tread base, said housing including a casing, and said casing including a compartment formed therein,
a lubricant supplying device including a container supported on said tread base for containing a lubricant, a Mouth provided on said container,
a pump device attached to said container for pumping the lubricant out of said container, said pump device including an insertion tube extended into said mouth of said container, and said pump device including a depressible knob having an outlet,
a first motor supported on said casing of said housing and including an actuating pin coupled to an actuating rod for actuating said actuating rod toward and away from said pump device and to force the lubricant to flow out through said pump device,
said actuating rod being slidably received and engaged in said compartment of said casing,
a pipe coupled to said outlet of said knob of said pump device for receiving the lubricant from said container and for supplying the lubricant out of said container and to lubricate said endless belt,
a second motor including a spindle, and a wheel attached to said spindle and rotated in concert with said spindle, and said wheel including a hub provided thereon and coupled to said pulley of said front roller,
a sensor disposed beside said wheel for sensing a rotational movement of said wheel, and
a control circuit electrically connected to said sensor and said first motor for receiving a detecting signal from said sensor and for actuating said first motor to move said actuating rod toward and away from said pump device.

2. The treadmill as claimed in claim 1, wherein said pump device includes a cover engaged with said mouth of said container for detachably securing said pump device to said container.

3. The treadmill as claimed in claim 1, wherein said housing includes a base frame attached to said tread base, and a bracket attached to said base frame, and said casing is attached to said bracket.

4. The treadmill as claimed in claim 1, wherein said tread base includes a post, said sensor is attached to said post.

5. The treadmill as claimed in claim 1, wherein said control circuit is supported on said housing.

* * * * *